United States Patent [19]

Okada

[11] Patent Number: 4,758,038

[45] Date of Patent: Jul. 19, 1988

[54] UPPER BODY STRUCTURE OF VEHICLE

[75] Inventor: Akiyoshi Okada, Hiroshima, Japan

[73] Assignee: Mazda Motor Corporation, Hiroshima, Japan

[21] Appl. No.: 26,467

[22] Filed: Mar. 16, 1987

[30] Foreign Application Priority Data

| Mar. 17, 1986 [JP] | Japan | 61-60239 |
| Mar. 17, 1986 [JP] | Japan | 61-60241 |
| Mar. 17, 1986 [JP] | Japan | 61-60242 |
| Mar. 17, 1986 [JP] | Japan | 61-60243 |

[51] Int. Cl.⁴ .......................................... B62D 31/00
[52] U.S. Cl. .................................. 296/26; 296/185; 296/210; 280/30
[58] Field of Search ................... 296/26, 216; 280/30

[56] References Cited

U.S. PATENT DOCUMENTS

| 2,939,742 | 5/1958 | Dardarian et al. | 296/107 |
| 3,061,359 | 10/1962 | Pearlman | 296/26 |
| 3,198,571 | 8/1965 | Majeski | 296/26 |
| 4,135,573 | 1/1979 | Zur | 296/26 |
| 4,168,859 | 9/1979 | Breitschwerdt et al. | 296/137 B |
| 4,286,821 | 9/1981 | Cooper | 296/216 |

Primary Examiner—Robert R. Song
Attorney, Agent, or Firm—Fleit, Jacobson, Cohn & Price

[57] ABSTRACT

A convertible type vehicle body structure comprising a main roof structure, a first roof section pivotally connected to the rear end portion of the main roof structure at the front end portion, a second roof section connected to the rear end portion of the first roof section at the front end portion by hinge, a rear deck structure to which the second roof section is pivotally connected at the rear end portion wherein the first and second roof sections displaceably carried by the body structure so as to displace to take plural positions so that the volume of the passenger compartment can be changed without an open roof condition.

29 Claims, 9 Drawing Sheets

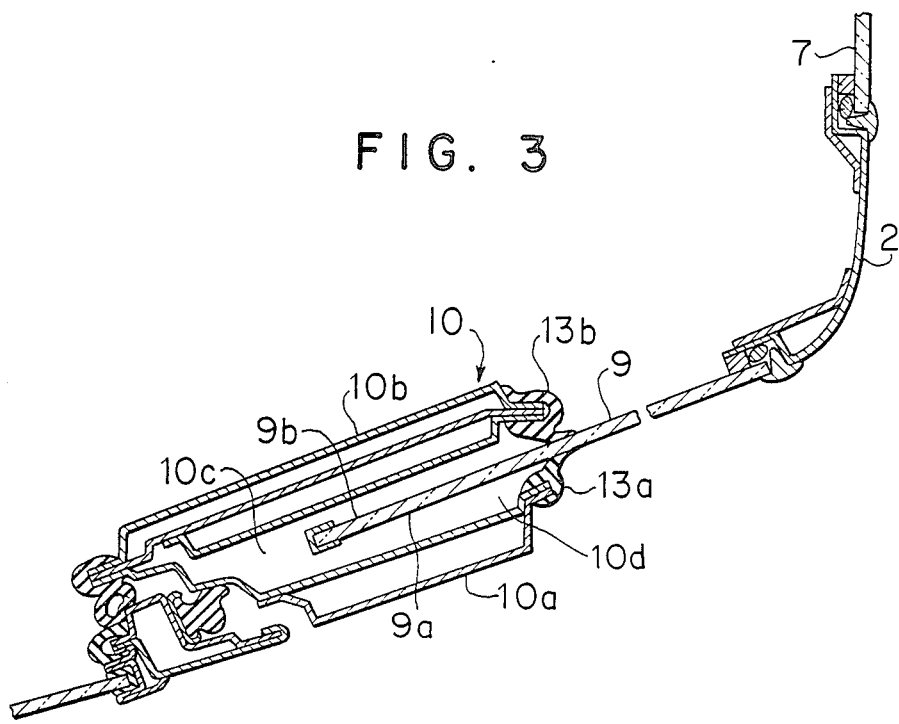
FIG. 3
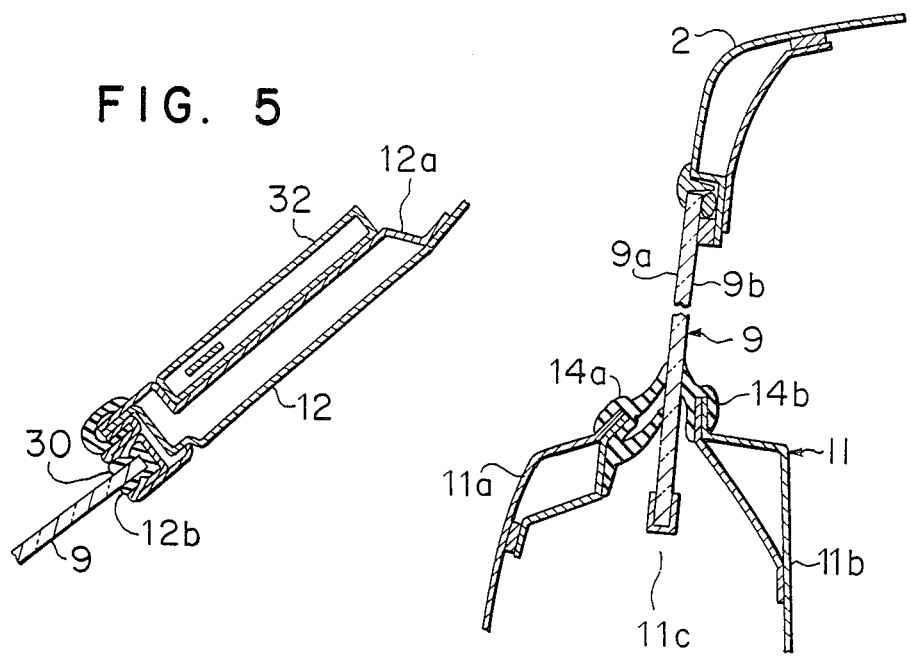
FIG. 4
FIG. 5

10

UPPER BODY STRUCTURE OF VEHICLE

BACKGROUND OF THE INVENTION

1. Field of the Invention

The present invention relates to an upper body structure for vehicles, particularly to a roof structure for a convertible type vehicle body.

2. Description of the Prior Art

There has been known a vehicle body structure provided with a displaceable roof section which can move in the longitudinal direction so that passenger compartment can be expanded rearwardly.

The U.S. Pat. No. 4,168,859 discloses a convertible type vehicle body having a slidable roof structure which can be displaced rearwardly in the vehicle longitudinal direction so as to facilitate the ingress of the passengers.

According to the disclosure of the above U.S. Patent, when the slidable roof structure is moved rearwardly, upper portion of the vehicle body is opened to expand the cabin space. It will therefore be understood that the disclosed convertible body structure is disadvantageous in that when rainy weather, passengers in the cabin get wet under the open roof condition thereof.

U.S. Pat. No. 2,939,742 discloses a vehicle body structure having a foldable vehicle top or roof in which folding movement of the top is controlled by taking advantage of the influence of the gravity. The foldable top section is moved between the lowered and raised positions by means of an electric motor and a cable connected to the foldable top section.

However the vehicle structure disclosed in the U.S. Pat. No. 2,939,742 cannot expand the space of the passenger compartment by the folding movement. It should further be noted that the same problem as the U.S. Pat. No. 4,168,869 will occur in the lowered position of the top because of the open roof structure.

SUMMARY OF THE INVENTION

It is an object of the present invention to provide a convertible type vehicle body structure having a foldable roof structure which can expand passenger compartment or cabin space of the vehicle.

It is another object of the present invention to provide a convertible type vehicle body structure in which passengers in the cabin do not get wet under the expanded condition of the cabin.

Still another object of the present invention is to provide a convertible vehicle body structure having a displaceable roof structure and quarter window in which the quarter window can open and close under the expanded condition of the roof structure.

Yet another object of the present invention is to provide a convertible vehicle body structure having a displaceable roof structure and quarter window in which the quarter window can be received in the vehicle body structure under the contracted condition of the cabin preventing interference between the quarter window and the vehicle body.

Still further object of the present invention is to provide a convertible type vehicle body structure in which a displaceable roof structure can be automatically operated.

According to the present invention, the above and other objects can be accomplished by an upper body structure comprising a main roof structure, a first roof section pivotally connected to the rear end portion of the main roof structure at the front end portion, a second roof section connected to the rear end portion of the first roof section at the front end portion by hinge means, a rear deck structure to which the second roof section is pivotally connected at the rear end portions wherein the first and second roof sections displaceably carried by the body structure so as to displace to take plural positions including at least a folded position in which the first roof section is inclined downwardly from the rear end portion of the main roof structure to define the rear portion of a passenger compartment with the second section being extended rearwardly from the rear end portion of the first roof section in line with the upper surface of the rear deck structure, and an expanded position in which the first roof section being extended rearwardly from the rear end portion of the main roof structure in continuity with the main roof structure form a portion of roof structure of the vehicle with the second roof section being inclined downwardly and extended from the rear end portion of the first roof section to the rear deck structure to define a portion of the passenger compartment.

In the present invention, the first and second roof sections are so constituted as to move to take plural positions such as folded position ans expanded position in accordance with the request of the passengers. In the expanded position, the space of the passenger compartment or cabin can be expanded avoiding an open roof condition of the vehicle so that the passenger does not get wet even under a rainy weather.

Preferably, the first and second roof sections are automatically driven by an appropriate driving means such as motor and hydraulic cylinder assembly.

The above and other objects and features of the present invention will be apparent from following descriptions of a preferred embodiment taking reference to the accompanying drawings.

BRIEF DESCRIPTION OF THE DRAWINGS

FIG. 3 is a sectional view taken along the line A—A in FIG. 2(c);

FIG. 4 is a sectional view taken along the line B—B in FIG. 2(c);

FIG. 5 is a sectional view taken along the line C—C in FIG. 2(c);

DESCRIPTION OF THE PREFERRED EMBODIMENTS

Figure 1:
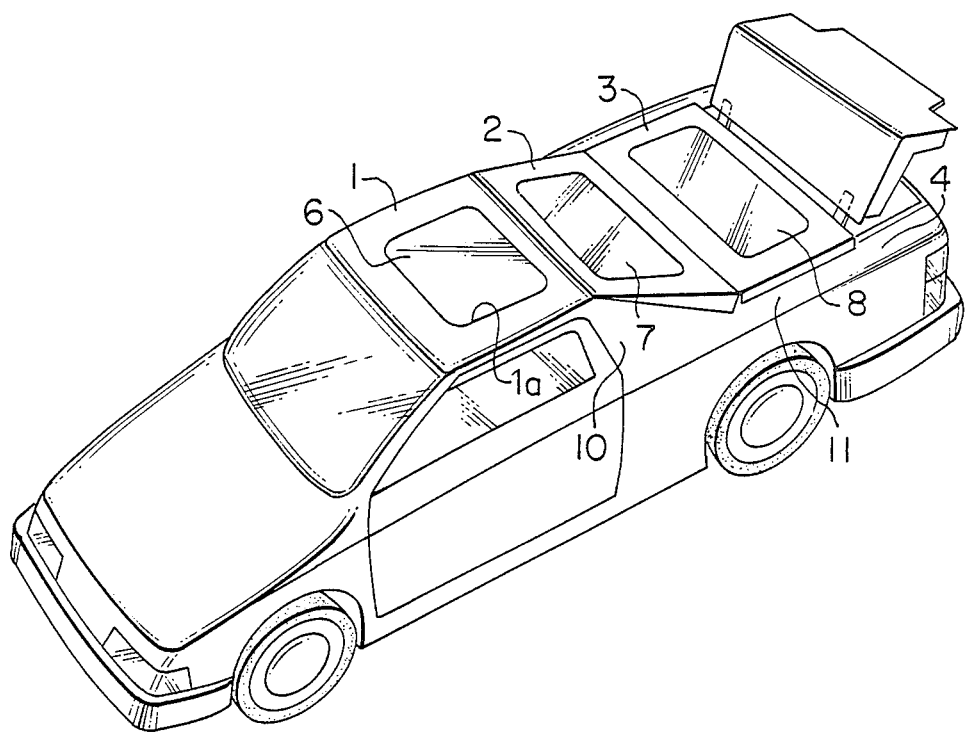
FIG. 1 is a perspective view of a vehicle having a convertible type roof structure in accordance with one embodiment of the present invention.

Referring to the drawings, particularly to FIG. 1, there is shown a convertible type vehicle having a main roof 1 forming an upper body structure of the vehicle. A first roof section 2 is pivotally connected to the rear end portion of the main roof 1 at the front end portion thereof. To the rear end portion of the first roof section 2 is connected a second roof section 3 at the front end portion thereof by a hinge mechanism. The rear end portion of the second roof section 3 is pivotally connected to a rear deck 4 of the body.

Figure 2A:
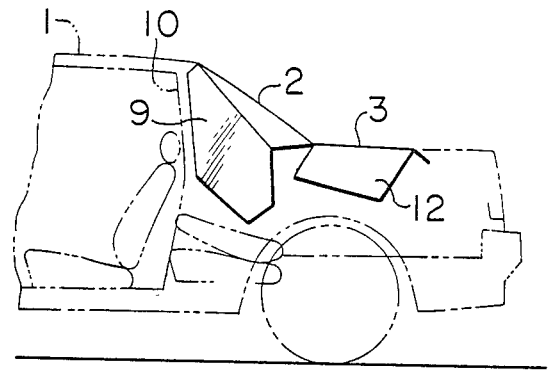
FIG. 2(a),(b) and (c) are schematic side views of the vehicle showing various conditions of displaceable roof structure in accordance with the present invention.
Figure 2B:
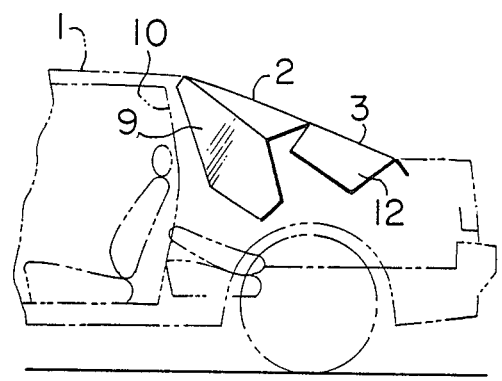
Figure 2C:
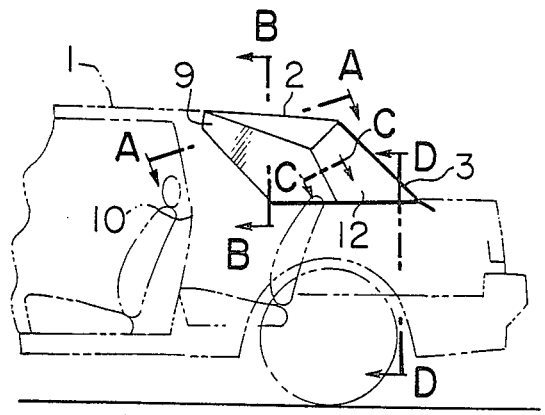
Figure 6:
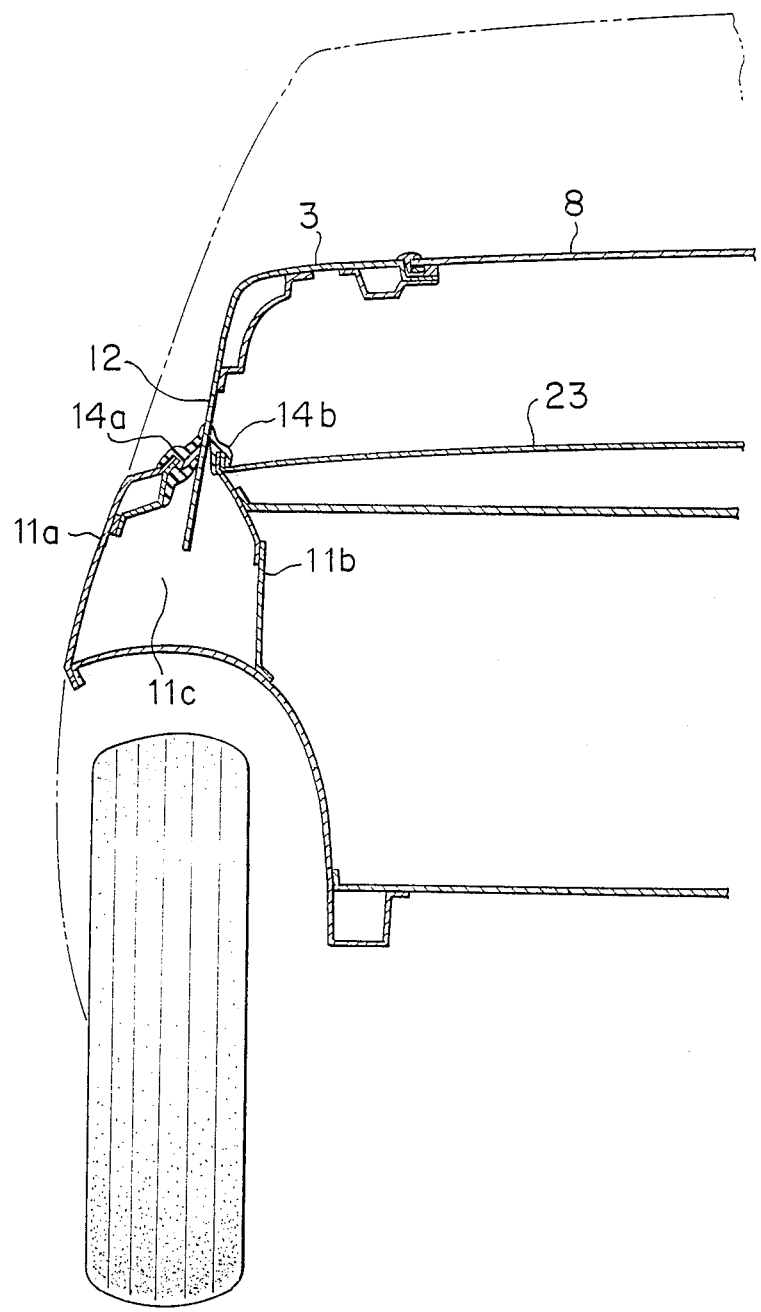
FIG. 6 is a sectional view taken along the line D—D in FIG. 2(c)

The first and second roof sections are capable of displacing to take a plurality of positional conditions as shown in FIG. 2(a), (b) and (c). In one condition or folded condition as shown in FIG. 2(a), the first roof section 2 is inclined and extended downwardly from the rear end of the main roof 1 to define a rear portion of passenger compartment or cabin. The second roof section 3 is extended horizontally or rearwardly from the lower end or rear end of the first roof section 2 in line with the upper surface of the rear deck 4. In an intermediate condition as shown in FIG. 2(b), the first roof section 2 is slightly inclined and extended downwardly and rearwardly from the rear end of the main roof 1. The second roof section 3 is also extended downwardly and rearwardly from the rear end of the first roof section 2 continuous thereto to thereby form a roof portion. In an expanded condition as shown in FIG. 2(c), the first roof section is extended horizontally or rearwardly from the rear end of the main roof 1 continuous thereto to constitute a rear roof structure. The second roof section 3 is inclined and extended downwardly and rearwardly from the rear end of the first roof section 2 to the rear deck 4 to constitute an expanded rear cabin portion.

The main roof 1 is formed with an opening 1a on which a sliding roof 6 is mounted so as to open and close the opening 1a.

The first and second roof sections 2 and 3 are provided with rectangule glasses 7, 8 at the central portions respectively. To the first roof section 2 are fixed quarter window structures 9 which are extended downwardly at the opposite ends which are retractable into center pillar structures 10. At the opposite ends, the second roof section 3 is provided with side panels 12 which are extended downwardly and retractable into rear fenders 11 rearward of the quarter windows 9. The quarter windows move with roof section 2. In the folded condition of the first and second roof sections 2, 3, the quarter window 9 is adapted to be received into a space 10d formed btween an outer panel 10a and inner panel 10b of the center pillar 10. Sealing members 13a and 13b are mounted on the panels 10a and 10b at the entrance portion to the space 10c to be brought into contact with the quarter windows 9 at the opposite side surfaces 9a and 9b as shown in FIG. 3. As shown in FIG. 4, in the expanded condition, the quarter window 9 is carried by sealing members 14a, 14b to be tightly sealed in a space 11c formed between an outer panel 11a and an inner panel 11b of the rear fender 11.

In the expanded condition of the first and second roof sections 2, 3, the rear end portion of the quarter window 9 can be displaceably engaged through a rubber 30 with a recess 12b formed in a reinforcement 12a of the side panel 12 of the second roof section 3 as shown in FIG. 5.

In the folded condition, the lower end of the side panel is retractably received in the space 11c through a guide opening 11d backward of the position at which the quarter window 9 is carried.

Figure 7:
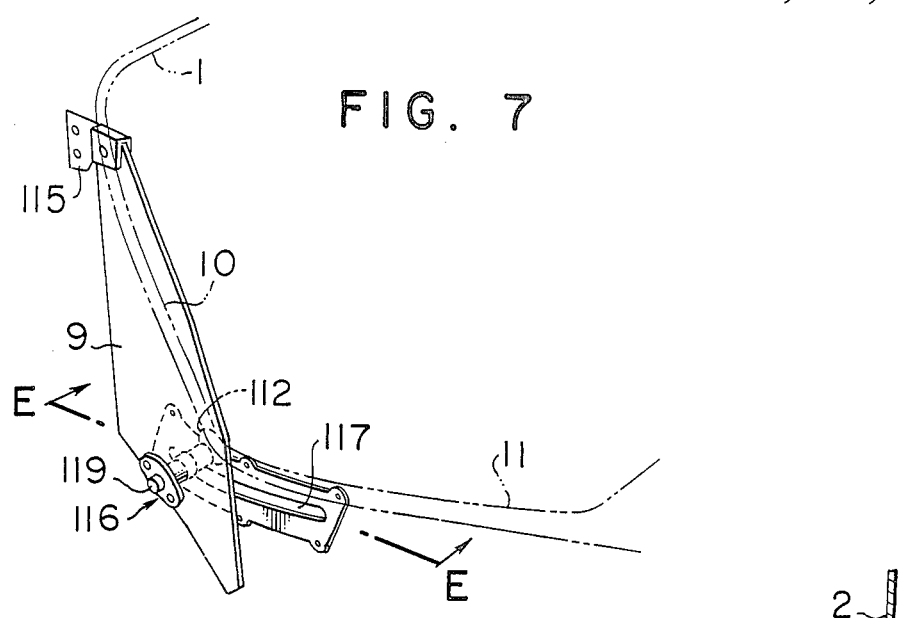
FIG. 7 is a perspective view in the vicinity of a second form of quarter window structure for the vehicle.
Figure 8:
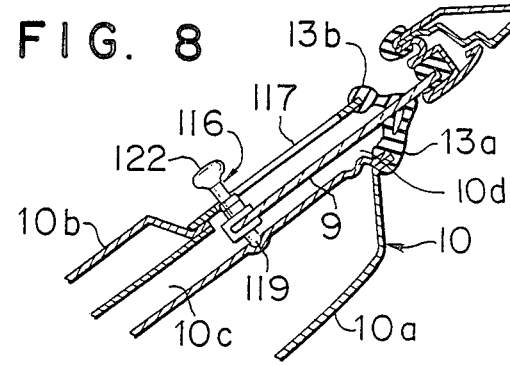
FIG. 8 is a sectional view taken along the line E—E in FIG. 7.

As shown in FIG. 7, the second form of quarter window 9 is pivotally mounted on the center pillar 10 through a hinge member 115 for movement of the quarter window independently of roof section in the longitudinal direction of the body. The quarter window 9 is introduced into the center pillar 10 through a guide opening 10d when swung toward the front side of the body. There is provided an engaging device 116 including anengaging member 119 which is engaged with an elongated hole 117 extending from the pillar 10 to the inner portion of the rear fender 11 to guide the quarter window 9.

Figure 9:
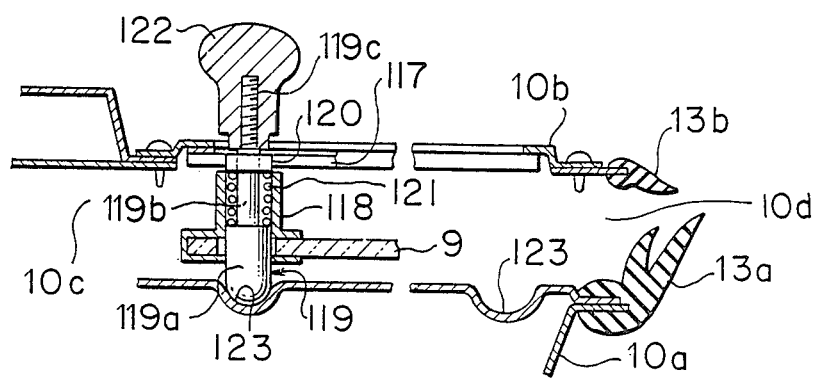
FIG. 9 is an enlarged sectional view of FIG. 8.

Theengaging member 119 formed with an enlarged portion 119a, reduced portion 119b and threaded portion 119c is slidably inserted in a supporting member 118 for thequarter window 9 as shown in FIG. 9. A roller 120 is rotatably engaged with the reduced portion 119b to move in the elongated hole 117. There is provided a spring 121 between the roller 120 and the enlarged portion 119a. Further a knob member 122 is screwed into the threaded portion 119c to project in the cabin. Thus, the tip end of the enlarged portion 119a of the engaging member 119 is adapted to be engaged with one of plural recesses 123 formed on outer portion of the rear fender 11 so that a certain opening rate can be maintained.

It is evident that in the second form of quarter window, a vehicleoccupant can selectively swing the window about hinge 15, using knob 122, when roof panel 2 is extended, so as to move the window into and out of pillar 10 to a greater or lesser extent, to open and close the window.

Figure 10A:
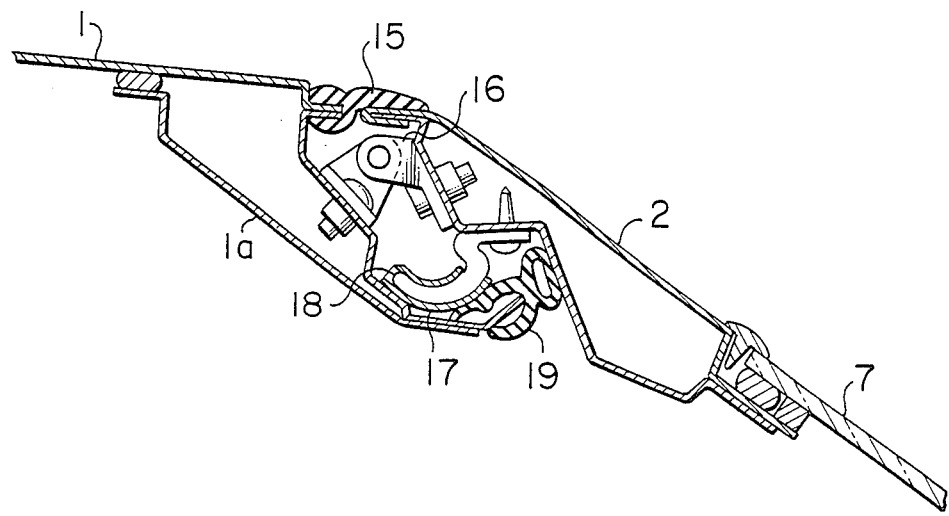
FIG. 10(a) and (b) are sectional views in the longitudinal direction of the vehicle showing the hinge portion between the main roof structure and the first roof section under the folded and expanded positions respectively.
Figure 10B:
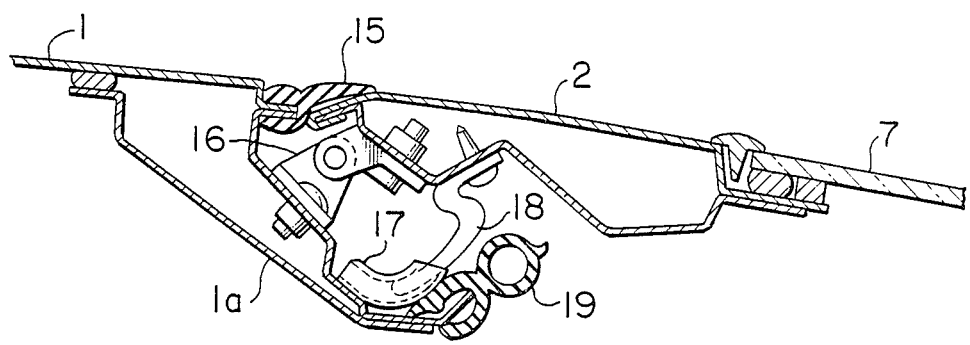

There is shown a sealing structure in the vicinity of a hinge mechanism between the main roof 1 and first roof section 2 in FIG. 10(a) and (b). A sealing member 15 is disposed in a clearance between the rear end portion of main roof 1 and the front end portion of the first roof section 2 in a manner extending across the vehicle body in the traverse direction of the body and covering the clearance. The first roof section 2 is swingably connected to a cross-sectioned reinforcement 1a formed in the main roof 1 through a hinge mechanism 16 below the sealing member 15.

Below the hinge mechanism 16, a hollow guide member 17 is mounted on the main roof 1 and a sealing member 18 is fixed to the first roof section 2.

Another sealing member 19 is disposed at the lowerend portion of the main roof 1 to be brought into contact with the lower end of the first roof section 2 under the folded condition of the first and second roof sections 2 and 3.

Figure 11A:
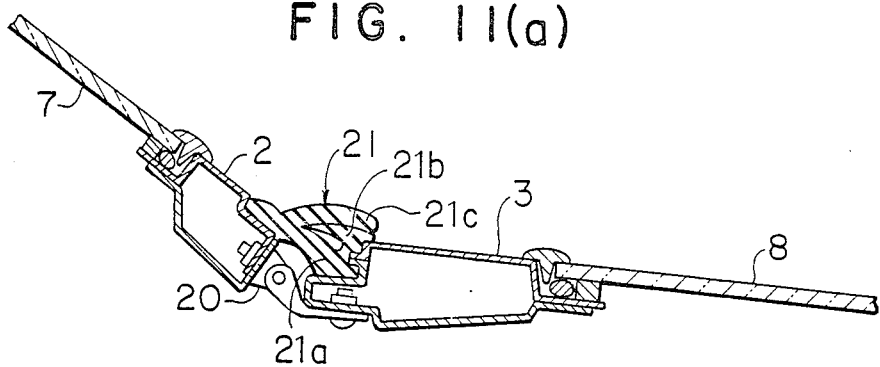
FIG. 11(a) and (b) are sectional views in the longitudinal direction of the vehicle showing the hinge portion between the first and second roof sections under the folded and expanded positions respectively.
Figure 11B:
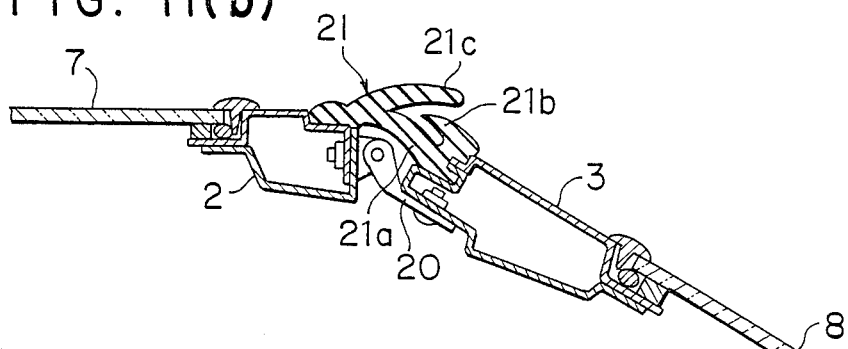
Figure 12A:
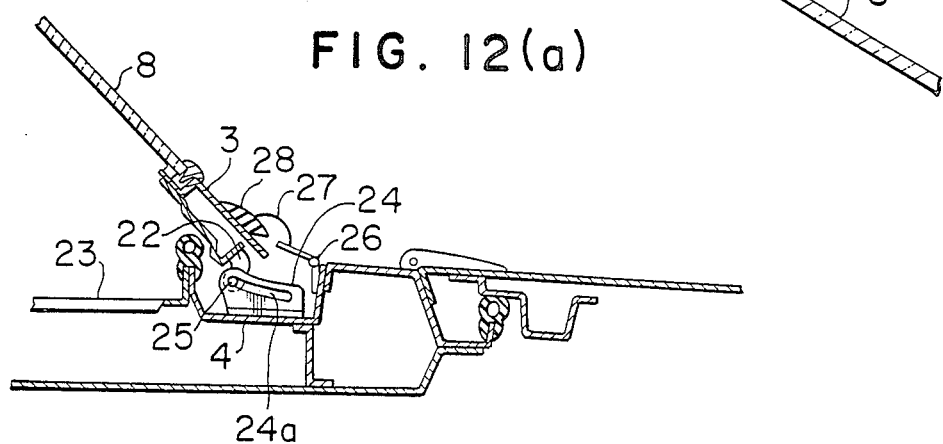
FIG. 12(a) is a sectional view in the longitudinal direction of the vehicle showing the hinge portion between the second roof structure and rear deck under the expanded condition of the roof structure.
Figure 12B:
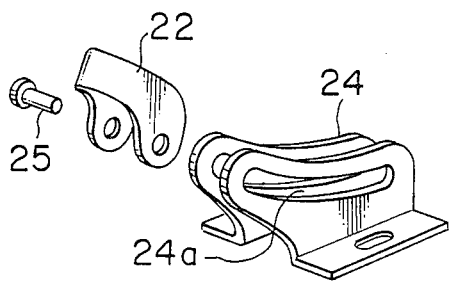
FIG. 12(b) is a perspective view of engaging mechanism in the hinge portion shown in FIG. 12(a)

There is disposed a sealing member 21 in a clearance between the first and second roof sections 2 and 3 as shown in FIG. 11(a) and (b) extending across the body in the traverse direction and covering the clearance above a hinge mechanism 20 allowing the first and second roof sections 2 and 3 to swing.

The sealing member 21 is formed with a base portion 21a extending across the first and second roof sections 2 and 3, a first tongue portions 21b projecting from the side of the second roof section 3 toward the front side of the vehicle body and a second tongue portion 21c located above the first tongue portion 21b and projecting rearwardly from the first roof section side 2 in which the second tongue portion 21c is longer than the first tongue portion 21b so that the two tongue portions 21b and 21c can be interlaced with each other in the folded condition to thereby improve the sealing effect.

To the rear end of the second roof section 3 ismounted a movable member 22 engaged through a pin 25 with a elongated hole 24a formed on a guide member 24 which is fixed to the rear deck 4 backward of a package tray 23. Above the movable member 22, a cover member 27 is mounted on the body through a hinge 26. A weather strip 28 is fixed to the tip end portion of the cover member 27 to be brought into slidable contact with the second roof section 3 across the body in the traverse direction.

Figure 13:
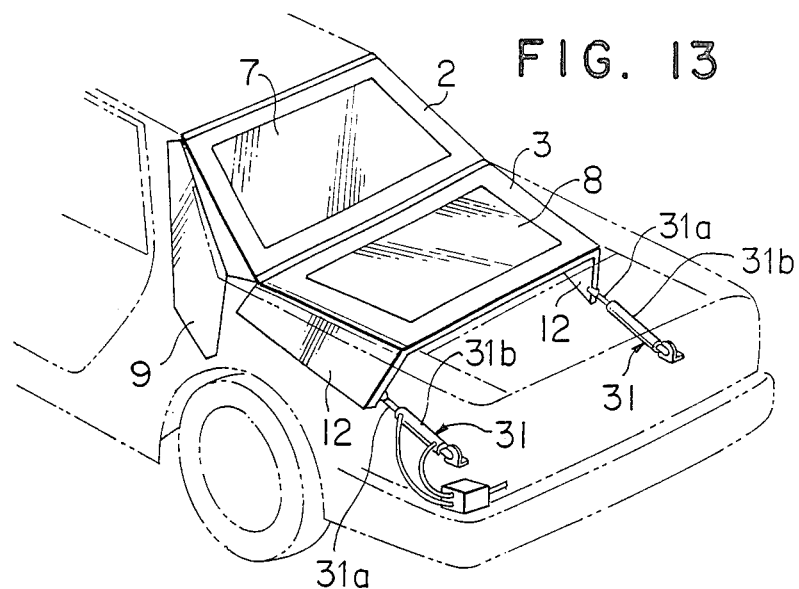
FIG. 13 is a perspective view showing a rear part of a vehicle provided with a driving mechanism including air cylinder assembly for the displaceable roof structure.
Figure 14:
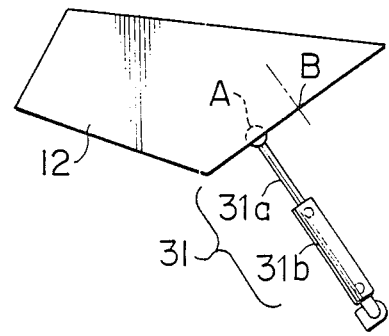
FIG. 14 is a schematic view showing side panel of the second roof structure and the air cylinder.

As shown in FIG. 13, to the rear end portion of the each side panel 12 is swingably connected a piston rod 31 of an air cylinder device 31 of which a base portion is swiingably connected to a fixed portion such as a rear portion of a tire housing. The pivotal point A of the piston rod 31a and the side panel 12 is located at a front side of the middle point B of the rear edge of the side panel 12 to be kept away from the point B so that driving force can be reduced for moving the first and second roof sections 2 and 3.

Figure 15:
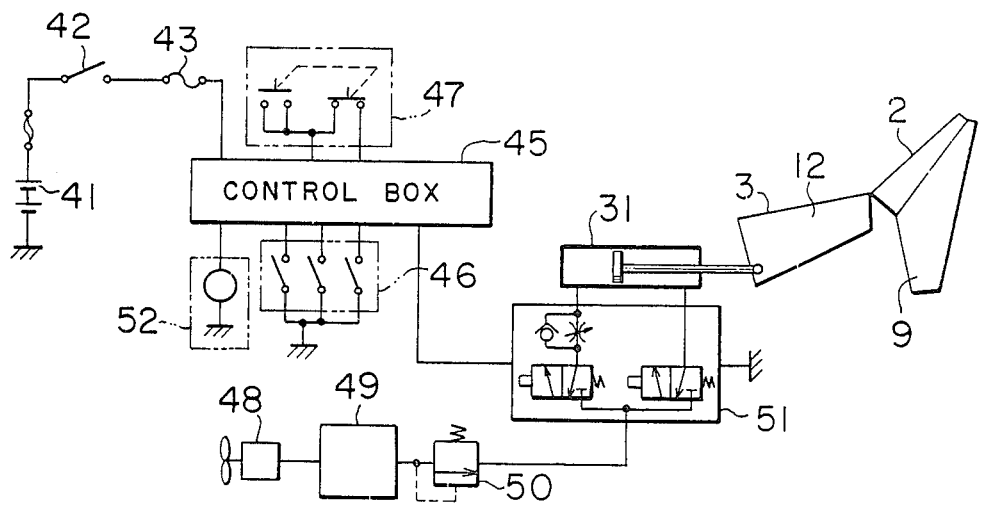
FIG. 15 is a circuit diagram for driving the air cylinder assembly.

There is shown a circuit diagram for the air cylinder device 31 in FIG. 15 in which reference numerals 41, 42, 43, and 45 designate a battery, ignition key, fuse, and control box respectively. To control box 45 are connected a detecting switch 46 for detecting the condition of the roof sections 2 and 3, and a switch 47 for driving the roof sections 2 and 3 so that the air supplied from an air pump 48 through an air tank 49 and regulating valve 50 is introduced into each air cylinder 31 through a solenoid valve box 51 including a speed control valve to drive the cylinder to thereby move the roof sections 2 and 3. there is provided a buzzer 52 for noticing the movement of the roof sections 2 and 3.

In operation, when the passenger operates to close the switch 47, the air cylinder is actuated to move the first and second roof sections 2 and 3 in accordance with the output of the detecting switch 46 so that the positional condition of the first and second roof sections can be readily controlled to change the space of the cabin in accordance with the passenger's request.

Figure 16:
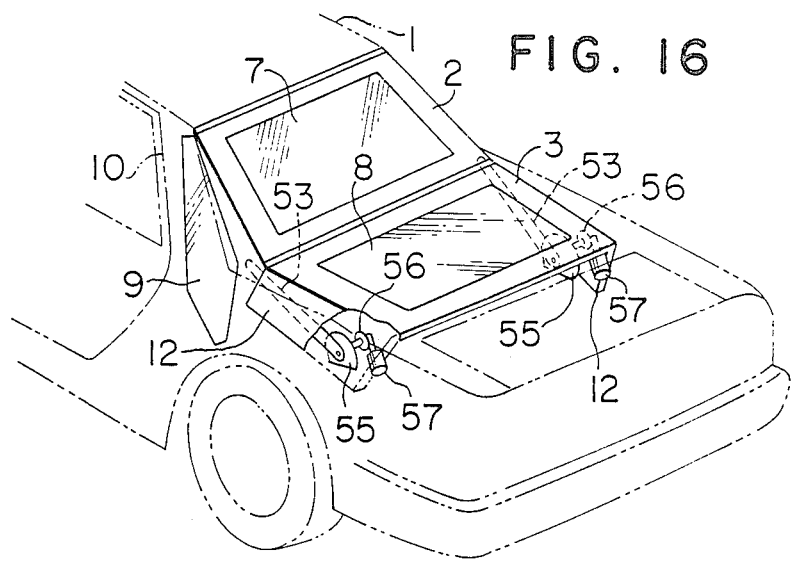
FIG. 16 is a perspective view showing a rear part of a vehicle provided with a driving mechanism including a drive motor for the displaceable roof strucutre in accordance with another embodiment of the present invention.
Figure 17:
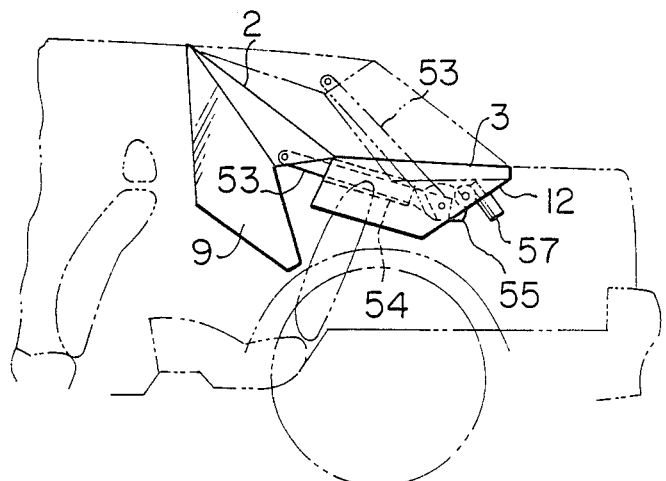
FIG. 17 is a schematic view showing side panel of the second roof structure and the driving mechanism in the embodiment of the FIG. 16; and, FIG. 18 is a circuit diagram of the drive motor in the FIG. 16.
Figure 18:
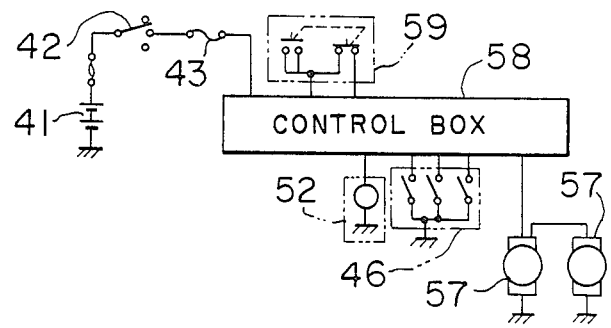

Referring to FIGS. 16, 17 and 18, there is shown another drive mechanism for driving the first and second roof sections 2, 3. a pair of link members 53 are swingably connected to the opposite sides of the first roof section 2 at one end thereof in the vicinity of the connection of the first and second roof sections 2, 3. The other ends of the link members 53 are swingably connected to fixed portions of the body such as tire housings. Each link member 53 is extended through a tubular member 54 fixed to the inner wall surface of the reinforcement 12a of the side panel 12. A sector gear 55 is fixed to the lower end of the link member 53. The sector gear 55 is brought into meshing engagement with a gear 56 driven by a motor 57 so that the link member 53 swings with the sector gear 55 along the inner wall of the second roof section 3 within the tubular member 54 in a vertical plane.

There is shown a circuit diagram in FIG. 18 for controlling the motor 57 including a control unit 58 to which an actuating switch 59 and the detecting switch 47 are connected. When the actuating switch 59 is operated, the motor is driven in accordance with the positional condition detected by the switch 47 to allow the link member 53 to swing automatically.

I claim:

1. An upper body structure of a vehicle comprising a main roof structure, a first roof section having a front end portion pivotally connected to a rear end portion of the main roof structure, a second roof section having a front end portion connected to a rear end portion of the first roof section by hinge means, a rear deck structure to which the second roof section is pivotally connected at a rear end portion of the second roof section wherein the first and second roof sections are displaceably carried by the body structure so as to take plural positions including at least a folded position in which the first roof section is inclined downwardly from the rear end portion of the main roof structure to define the rear portion of a passenger compartment with the second section being extended rearwardly from the rear end portion of the first roof section in line with the upper surface of the rear deck structure, and an expanded position in which the first roof section is extended rearwardly from the rear end portion of the main roof structure in continuity with the main roof structure to form a portion of roof structure of the vehicle with the second roof section being inclined downwardly and extended from the rear end portion of the first roof section to the rear deck structure to define a portion of the passenger compartment.

2. An upper body structure of vehicle in accordance with claim 1 in which quarter window means are provided at the opposite sides of the first roof section.

3. An upper body structure of vehicle in accordance with claim 2 in which each quarter window means is constructed to be retractable into a center pillar structure.

4. An upper body structure of vehicle in accordance with claim 3 in which the center pillar structure comprises an inner panel and outer panel with a space therebetween where the quarter window means can be received, the space being provided with an opening portion at a rear end portion thereof through which the quarter window means is projected and retracted.

5. An upper body structure of vehicle in accordance with claim 4 in which sealing means are mounted on the opening portion for sealing the quarter window means at the oppsite sides.

6. An upper body structure of vehicle in accordance with claim 3 in which the lower end of a quarter glass of the quarter window means is retractable into a quarter panel structure of the quarter window means.

7. An upper body structure of vehicle in accordance with claim 6 in which the quarter panel is provided with sealing means at the upper end portion.

8. An upper body structure of vehicle in accordance with claim 2 in which the quarter window means is fixed to the side end of the first roof section.

9. An upper body structure of vehicle in accordance with claim 2 comprising center pillar structures disposed between the rearward of the main roof and the body to extend in the up and down direction, quarter window means disposed in a space defined by the first and second roof sections and body panel, the quarter window means being swingably mounted on one of the main roof structure and the first roof section at the connecting portion of the main roof structure and the first roof section in the longitudinal direction of the vehicle, and the center pillar being formed with a receiving space therein for receiving the quarter window means and an opening portion at the rear end for introducing the quarter window means into the receiving space.

10. An upper body structure of vehicle in accordance with claim 9 in which the quarter window means is connected to the center pillar at the upper portion by hinge means.

11. An upper body structure of vehicle in accordance with claim 9 in which the quarter window means is slidably carried by a sliding mchanism of the body.

12. An upper body structure of vehicle in accordance with claim 11 in which the quarter window means is brought into engagement with recesses formed on the body through engaging means provided at the lower end of the the quarter window means.

13. An upper body structure of vehicle in accordance with claim 2 in which side panels are provided at the opposite sides of the second roof section to extend downwardly.

14. An upper body structure of vehicle in accordance with claim 13 in which sealing means are provided at the front end of the side panel so that the rear end of the quarter window means is brought into engagement with the sealing means to thereby seal the quarter window means.

15. An upper body structure of vehicle in accordance with claim 2 in which there is provided sealing means in a connecting portion between the first and second roof sections.

16. An upper body structure of vehicle in accordance with claim 15 in which the sealing means is provided with a base portion fixed to the first and second roof sections, a first tongue portion extending forwardly or rearwardly and upwardly, and a second tongue portion extending upwardly from the first tongue portion.

17. An upper body structure of vehicle in accordance with claim 2 further comprising a hollow guide member disposd traversely at the rear end of the main roof structure to be opened rearwardly, and sealing means disposed at the front end of the first roof section to be slidably engaged with the guide member.

18. An upper body structure of vehicle in accordance with claim 17 further comprising sealing means extending traversely for sealing the main roof structure and first roof section above the guide member.

19. An upper body structure of vehicle in accordance with claim 17 further comprising sealing means extending traversely and carried by the rear and lower end of the main roof structure for sealing the front and lower end portion of the first roof section below the guide member.

20. An upper body structure of vehicle in accordance with claim 2 further comprising a movable means swingably connected with the second roof section at one end and with a fixed portion of the body at the othr end for swinging the first and second roof section, the movable means being further connected with a driving means for driving the movable means to expand and contract.

21. An upper body structure of vehicle in accordance with claim 20 in which the movable means is an air cylinder device.

22. An upper body structure of vehicle in accordance with claim 20 in which the second roof section in pivotally mounted with the body at the rear end, the other end of the movable means being carried at the point located in the front side of the middle point in the rear edge of the second roof section.

23. An upper body structure of vehicle in accordance with claim 2 furthe comprising link member swingably connected with a fixed portion of the body at one end and with the first roof section or second roof section in the vicinity of the connecting portion thereof at the other end, the link member being adapted to swing along the inner wall surface of the second roof section in the up and down direction by driving means.

24. An upper body structure means of vehicle in accordance with claim 23 in which the link member is connected with the rear end of the first roof section at the other end.

25. An upper body structure means of vehicle in accordance with claim 24 in which the link member swings around the one.end thereof in the up and down direction by means of a motor.

26. An upper body structure of vehicle in accordance with claim 23 further comprising side panels at the opposite ends of the second roof section, and a cover member provided in the inner wall of the second roof section wherein the link member is received between the cover member and the inner wall.

27. An upper body structure of vehicle in accordance with claim 26 in which the cover member is constituted by a tubular member, the link member being extended through the the tubular member.

28. An upper body structure of vehicle in accordance with claim 2 in which the second roof section is pivotally mounted on the body at the rear end so as to move in the longitudinal direction of the vehicle.

29. An upper body strucutre of vehicle in accordance with claim 28 further comprising a guide member fixed to the body, the guide member being formed with a longitudinally elongated hole with which the second roof section is engaged at the rear end through a pin means.

* * * * *